United States Patent
Stoll et al.

(10) Patent No.: US 7,058,256 B1
(45) Date of Patent: Jun. 6, 2006

(54) OPTICAL FILTER, ADJUSTABLE ADD-DROP-CONTINUE MODULE AND CIRCUIT FOR BUNDLED CROSS-CONNECTION FUNCTIONALITY

(75) Inventors: Detlef Stoll, Boca Raton, FL (US); Harald Bock, Augsburg (DE); Patrick Leisching, München (DE); Christian Scheerer, München (DE); Gerhard Stortz, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/807,232

(22) PCT Filed: Oct. 6, 1999

(86) PCT No.: PCT/DE99/03227

§ 371 (c)(1),
(2), (4) Date: Apr. 9, 2001

(87) PCT Pub. No.: WO00/22479

PCT Pub. Date: Apr. 20, 2000

(51) Int. Cl.
*G02B 6/00* (2006.01)
*G02B 6/28* (2006.01)

(52) U.S. Cl. .................... 385/24; 385/147; 398/79; 398/87

(58) Field of Classification Search ............. 385/35–37, 385/24, 12, 31, 141, 13, 123, 147; 398/79, 398/87
See application file for complete search history.

(56) References Cited

U.S. PATENT DOCUMENTS

| | | | | |
|---|---|---|---|---|
| 5,042,898 A | * | 8/1991 | Morey et al. ................ 385/37 |
| 5,408,319 A | | 4/1995 | Halbout et al. |
| 5,706,375 A | | 1/1998 | Mihailov et al. |
| 5,963,685 A | | 10/1999 | Nishino |
| 5,987,200 A | * | 11/1999 | Fleming et al. ............ 385/37 |
| 5,999,671 A | * | 12/1999 | Jin et al. ..................... 385/37 |
| 6,061,481 A | * | 5/2000 | Heidrich et al. ............ 385/14 |
| 6,249,365 B1 | * | 6/2001 | Mizrahi et al. ............. 398/9 |
| 6,411,746 B1 | * | 6/2002 | Chamberlain et al. ...... 385/2 |

FOREIGN PATENT DOCUMENTS

| | | |
|---|---|---|
| EP | 0 854 378 A2 | 7/1998 |
| WO | WO 98/04954 | 2/1998 |
| WO | WO 99/42893 | 8/1999 |

* cited by examiner

*Primary Examiner*—Akm Enayet Ullah
(74) *Attorney, Agent, or Firm*—Bell Boyd & Lloyd LLC

(57) ABSTRACT

An optical filter, adjustable add-drop-continue module and circuit for bundled cross-connect functionality, wherein the transmission response of the optical filter is varied by changing its temperature, tuning of the filter can be carried out by mechanical pressure or tension, the filter can be used to produce add-drop-continue modules which are suitable both for add-drop operation and for drop-continue operation, and cross-connect modules can be constructed from the optical filters.

19 Claims, 7 Drawing Sheets

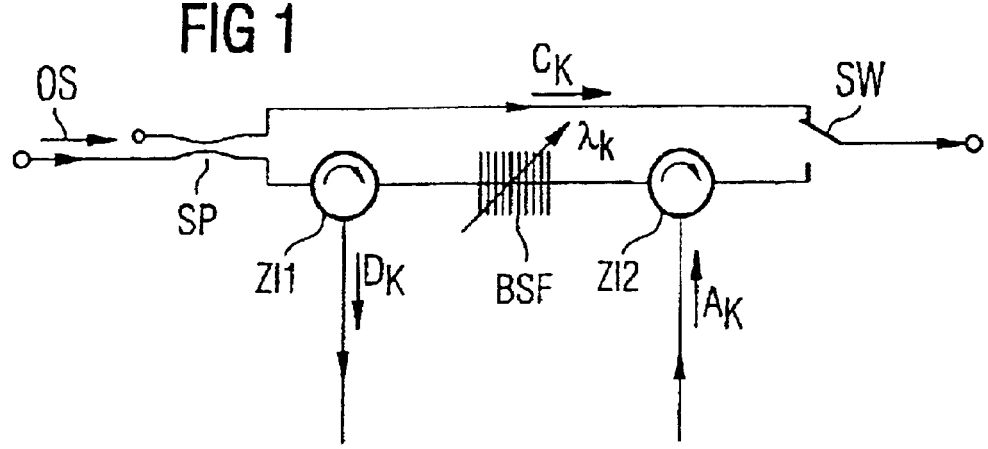
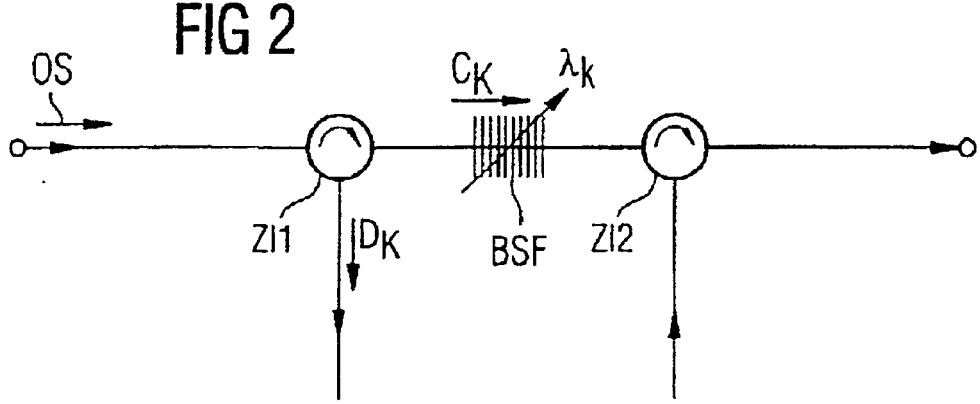
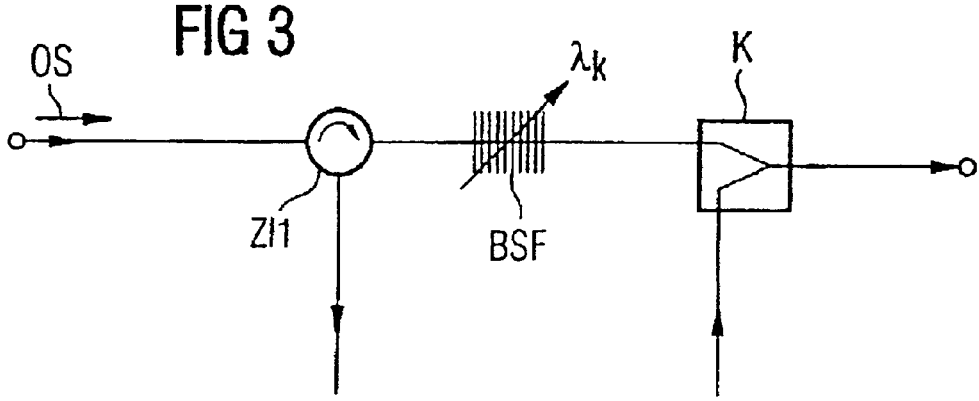

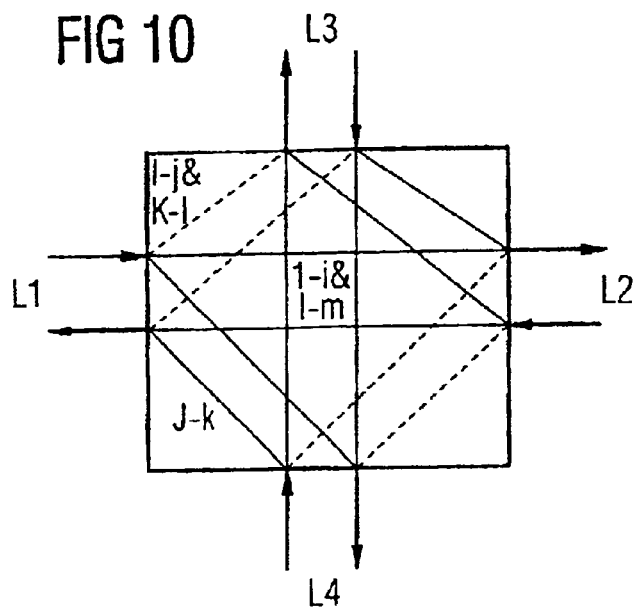
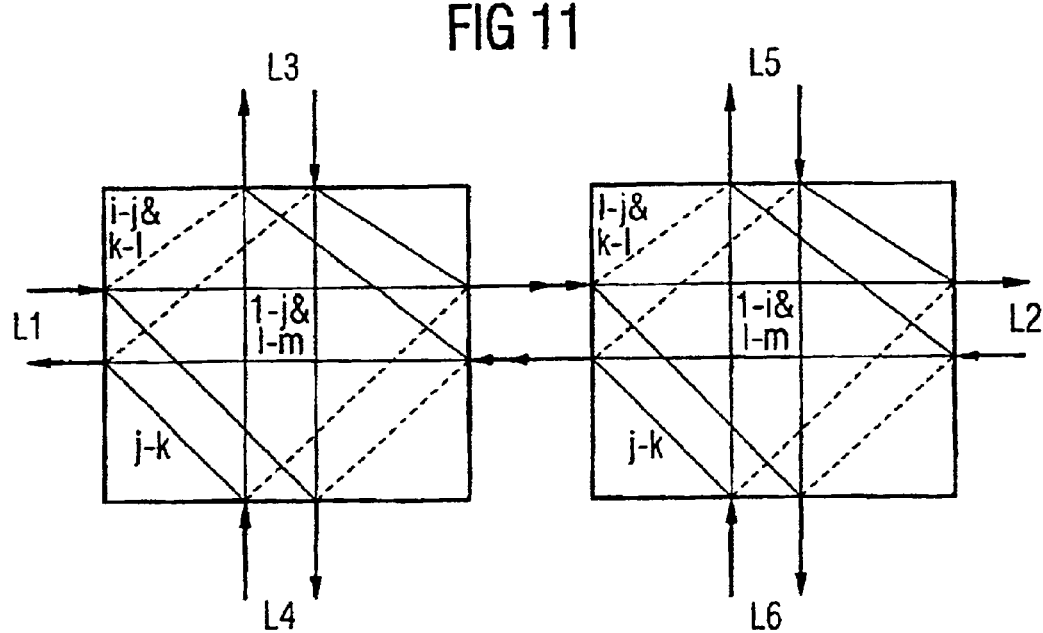

OPTICAL FILTER, ADJUSTABLE ADD-DROP-CONTINUE MODULE AND CIRCUIT FOR BUNDLED CROSS-CONNECTION FUNCTIONALITY

BACKGROUND OF THE INVENTION

1. Field of the Invention

The present invention relates to a tunable optical filter, to an add-drop-continue module which is produced using this filter, to an add-drop-continue device and to a circuit for bundled cross-connect functionality.

2. Description of the Prior Art

In order to ensure minimal interference during signal transmission, optical wavelength multiplex networks (WDM networks) are redundantly designed. Ring structures are often provided. At junctions between different rings, "drop-and-continue" functions are implemented; i.e., the signal is split and is both forwarded through the original ring and transferred into the new ring. For purely optical production of a drop-and-continue function, it is possible to use wavelength demultiplexers, optical switches and wavelength multiplexers.

For the production of add-drop functions, modules from the company High Wave Technologies are known; which consist of two circulators with interposed tunable filters. In the event of tuning due to a configurational change, however, the retuning of one WDM channel generally interferes with the signals of other WDM channels. These modules are not intended for drop-and-continue functions. It is, however, conceivable to supplement this module with splitters and switches, in order to produce the drop-and-continue function.

FIG. 1 represents such an "add-drop-continue module". It consists of a splitter SP; which divides the optical signal into two signals of roughly equal strength. One component is fed via two circulators having a tunable filter connected in between. In order to produce the drop-and-continue function, one signal component $D_k$ is branched off via the first circulator and the other signal component $C_k$ is forwarded via an optical switch SW (the switch position which is represented).

In the case of an add-drop function, one signal component $D_k$ is likewise branched off, but a new signal $A_k$ having the same wavelength is simultaneously inserted via the second circulator ZI2. Owing to the use of the optical splitter, the module has in principle an attenuation of at least 3 dB. Depending on the number of add-drop functions, the aforementioned add-drop element is multiply connected in series, so that the attenuation is further increased significantly.

The cross-connect functionality in optical multi-wavelength multiplex systems (WDM) is needed so that a specific wavelength signal of an incoming multi-wavelength signal can be distributed in any desired direction.

"WDM Gridconnect—ein transparentes faseroptisches Kommunikationsnetz mit Faser—und Wellenlängenmultiplex" [WDM grid-connect—a transparent fiber-optic communications network having fiber and wavelength multiplex] by Hubert Anton Jäger, published by Hartung-Gorre-Verlag, Constance [Germany] 1998 describes a standard optical cross-connect (OXC). Such an optical cross-connect (OXC) having optical n×n space-switching subunits with n incoming bidirectional multi-wavelength signals, each having k wavelengths, is represented in FIG. 9. In this case, the optical multi-wavelength signal is decomposed via optical wavelength demultiplexers DMUX into k single-frequency signals which are subsequently switched to any desired output of the space-switching subunit by using optical space-switching subunits of dimension n×n. The single-frequency signals coming together from the outputs of the space-switching subunits are coupled and forwarded via a multiplexer MUX.

A disadvantage with this is the large outlay on equipment which is incurred when making these optical cross-connects (OXC). A circuit having, for example, 64 wavelengths per multi-wavelength signal and 4 bidirectional conductors needs 64 space-switching subunits of dimension 4×4. Furthermore, 64 fiber-optic connections to the corresponding space-switching subunits of dimension n×n have to be installed per multiplexer MUX and demultiplexer DMUX, respectively, plus the same number again from the space-switching subunits to the demultiplexers DMUX or multiplexers MUX on the other side.

JP 1 023 479/U.S. Pat. No. 5,963,685 describes an add-drop module which contains a number of reflection filters whose frequencies can be adjusted by mechanical pressure and changing the temperature.

The patent U.S. Pat. No. 5,707,375 likewise specifies an add-drop device whose filters have different and mutually asymmetric edges. By tuning the filters in terms of wavelength, it is possible to obtain complete transmission, complete reflection or partial transmission and reflection. In this solution, it is necessary to have double the number of filters and adjustment devices. However, readjustment of the wavelength during operation leads to interference with the other signals.

The European patent application EP 0854 378 A2 describes a thermal-optical component which has a splitter and a tunable grating filter. The arrangement operates as an optical switch and can be used to produce add-drop functions. The patent U.S. Pat. No. 5,408,319 describes an optical demultiplexer in which tuning to a specific wavelength is carried out not mechanically but by changing the temperature.

The patent application WO 98/04854 describes an add-drop module which can be tuned by heating strips or magnetoresistors.

WO 99/42893 also discloses a tunable add-drop multiplexer. In order to tune the wavelength, the refractive index of the filter material is changed, for example by heating.

The known principles are unsuitable or too elaborate for producing an add-drop-continue function.

It is an object of the present invention to propose an add-drop-continue module having little attenuation, as well as a filter which is suitable for its production and which has a variable transmission characteristic. This module is also intended to permit reconfiguration of channels without causing interference.

It is another object of the present invention to propose a circuit having cross-connect functionality which allows simple allocation of dynamically assembled multi-wavelength bundles to different conductors. It is another object of the present invention to propose a circuit having cross-connect functionality, which permits reduced complexity of the system. In this case as well, reconfiguration of channels is intended to be made possible without causing interference.

SUMMARY OF THE INVENTION

Accordingly, there is a special advantage of the module of the present invention, and of the circuit for producing bundled cross-connect functionality, due to a filter whose frequency and attenuation can be varied. This not only makes it possible to select different channels, it also results in no optical switches being necessary for producing add-drop, drop-continue or cross-connect functions. Reconfiguration of the network can be carried out without interference to adjacent signals.

In particular, the present invention is achieved by an optical filter, wherein a device is provided for adjusting the transmission response via a deliberate temperature change. The effect achieved by adjusting the transmission response through temperature changes is that the optical filter is non-destructively reconfigurable, which has never before been possible in the case of purely optical network elements except with expensive optical circuit technology (wavelength multiplexers, wavelength demultiplexers, space-switching matrices). In contrast to standard wavelength filters, the transmission attenuation can also be adjusted in addition to the resonant wavelength in the optical filter according to the present invention.

In another preferred exemplary embodiment of the optical filter, at least two regions in an optically transparent material, which have different temperature-dependent refractive indices are essentially involved in the optical waveguiding and/or the filter action, and wherein the difference between the refractive indices is at least approximately zero at one temperature within the temperature-controllable working range. The temperature-dependent difference in refractive index between two optical materials is hence influenced by the deliberate change of temperature. This exploitation of the thermo-optical effect to influence the quality factor of the resonance is performed by adjusting the resonant wavelength and the transmission attenuation d for this wavelength. On the grounds of conservation of energy, the reflection factor is obtained directly from the transmission response in the ideal case. Energy components which are not transmitted must necessarily be reflected. The resonant wavelength is essentially influenced by the period of the interfaces. The transmission attenuation is essentially given by (besides the grating length and the grating amplitude) the difference in refractive indices.

The optical filter according to the present invention is advantageously designed in planar technology. This facilitates integration into existing circuitry. The optical filter is furthermore preferably produced as a fiber grating. The difference in refractive index between two optical layers involved in the waveguiding is of essential importance in the case of fiber gratings as well. The principle employed here, namely to influence the transmission attenuation by a thermal refractive-index change, preferably may be used in the case of such filters as well.

An optical filter is preferably designed as a tunable band-stop filter. This facilitates the extraction of a frequency band. The latter is advantageous especially in purely optical telecommunications networks.

The tuning of the band-stop filter is preferably carried out by mechanical pressure, tension or bending. As such, the wavelength to be filtered in the optical spectrum can be selected by exposing the band-stop filter to mechanical influence.

The present invention is furthermore achieved by an add-drop-continue module having an optical filter according to the present invention, wherein the tunable optical filter is arranged between a branching device for optical signals and an insertion device. Accordingly, an add-drop-continue module can be constructed using an optical filter according to the present invention. The signal is split in the branching device for optical signals, and one component is fed to the gate of the optical filter according to the present invention. The component to be extracted is reflected and forwarded, whereas the component to be injected is inserted by the insertion device.

In another preferred add-drop-continue module of the present invention, a number of optical filters are arranged between a branching device for optical signals and an insertion device. Though this arrangement, it is possible for a number of individually adjustable optical spectra to be extracted from the signal and, preferably, to be injected or re-extracted via multiplexers and demultiplexers, respectively.

In another preferred add-drop-continue module of the present invention, circulators are provided as the branching devices and as the insertion device. As such, the injection and extraction of the signals can be carried out using known hardware components. Triple circulators are preferably used for this and quad circulators are even more preferably used. It is also possible to use Mach-Zehnder structures.

The objects of the present invention are preferably achieved by an add-drop-continue device, wherein a number of series-connected add-drop modules of the present invention are provided. Accordingly, it is possible to fulfill a very wide variety of circuit tasks within purely optical networks.

In another preferred drop-and-continue module having an optical filter according to the present invention, the optical filter is connected downstream of a branching device for optical signals. It is then possible to produce the drop-and-continue functionality by using purely optical hardware components.

The present invention is furthermore achieved by a cross-connect module which includes at least one optical filter according to the present invention. As such, it is possible to provide a cross-connect module in which the reconfiguration can take place non-destructively. The possibility of controlling the transmission response of the optical filter by deliberately changing the temperature allows the filter action of the optical filter to be suspended by the appropriate temperature selection. At this moment, the filter does not in any way interfere with adjacent channels since no reflection takes place. Tuning of the filter then can be advantageously carried out. When the optical spectrum is being changed, adjacent optical spectra are crossed without causing any effect on the signals that likewise may be transported in this circuit over these optical spectra. It is hence possible to select a new channel without thereby influencing, or even interfering with, the channels or the signal flow which need to be crossed in doing so. After the desired new spectrum or channel has been reached, the reconfiguration is completed by resetting the temperature in such a way that the filter action restarts. This is preferably done by returning the difference in refractive indices to a magnitude greater than zero by the temperature change.

A preferred cross-connect module of the present invention includes at least one add-and-drop module. Accordingly, it is then possible to construct the cross-connect module from add-and-drop modules.

Another preferred cross-connect module of the present invention has at least one quad circulator and/or at least one Mach-Zehnder structure. It is possible to reduce the number of circulators used.

A cross-connect device is preferably provided which contains a number of series-connected cross-connect modules of the present invention. Through this arrangement, it is possible to cascade the circuit arrangements and hence interconnect even more lines.

In a preferred method of the present invention for the non-destructive tuning of a filter, the filter loses its filter characteristic as a result of a first temperature change, then the tuning of the filter is carried out, and then the filter regains its filter characteristic as a result of a second temperature change. This method permits non-destructive reconfiguration of purely optical network elements. The exploitation of the thermo-optical effect to influence the quality factor of the resonance of the filter makes it possible to adjust the filter, by a first temperature change, in such a way that it loses its filter characteristic. This is preferably done by adjusting the temperature-dependent refractive indices in such a way that the difference becomes zero. So long as the filter has been "switched off" in this way, the tuning of the filter can be carried out without influencing adjacent channels or channels which are crossed. Once the new channel has been reached, i.e. the filter has been tuned to the new optical spectrum, the filter is "switched on" again by a second temperature change. In doing so, the temperature is preferably changed in such a way that the refractive indices again have a predetermined difference.

As such, a method for the non-destructive reconfiguration of purely optical network elements, in particular of the filter according to the present invention, is procured.

The optical filters of the present invention are particularly preferably used for the production of a circuit having add-and-drop functionality, and/or a circuit having drop-and-continue functionality, and/or a circuit having multicast functionality, and/or a circuit having dual-homing functionality, and/or a circuit having cross-connect functionality. Multicast is the deliberate linking of a plurality number of selected receivers to one transmitter (also referred to as group call). Dual homing is the connection of one receiver via two different network elements and paths. Pursuant to this arrangement, it is possible to provide purely optical network elements which have the functionalities referred to above and are at the same time non-destructively tunable or reconfigurable.

Additional features and advantages of the present invention are described in, and will be apparent from, the Detailed Description of the Preferred Embodiments and the Drawings.

DESCRIPTION OF THE DRAWINGS

FIG. 1 shows a known add-drop-continue module;

FIG. 2 shows an add-drop-continue module according to the present invention;

FIG. 3 shows a variant of the add-drop-continue module of the present invention;

FIG. 10 shows a schematic representation of a cross-connect module in WDM-systems;

FIG. 11 shows cascaded cross-connect modules;

DETAILED DESCRIPTION OF THE PREFERRED EMBODIMENTS

The add-drop-continue module represented in FIG. 1 has already been explained in the introduction to the description. The splitter SP and the optical switch SW may be omitted if a tunable filter is being used which has 0.25 resonant attenuation, so that a specific component of the energy of an optical signal, for example half of the energy, is reflected and the remaining component is forwarded via the second circulator.

FIG. 2 represents such an add-drop-continue module. It contains a first circulator ZI1, a tunable filter BSF and a second circulator ZI2. The transmission frequency of the filter can be continuously altered. The module a therefore can be used for a plurality number of wavelengths.

The attenuation of the filter can be changed by deliberately controlling the temperature, so that one signal range $D_k$ is reflected by the filter and branched off, and the other signal component $C_k$ is transmitted. It is hence possible to switch between the add-drop function and the drop-and-continue function using the same element, without optical switches being required. Of course, no signal is inserted in the drop-and-continue function (represented in FIG. 2).

FIG. 3 represents a variant of the add-drop-continue module, in which the second circulator has been replaced by a coupler KO. Although this variant is lees expensive, the coupler has greater attenuation.

If only the drop-and-continue function is to be produced, the second circulator or coupler may, of course, be omitted in a drop-and-continue module.

Figure 4:
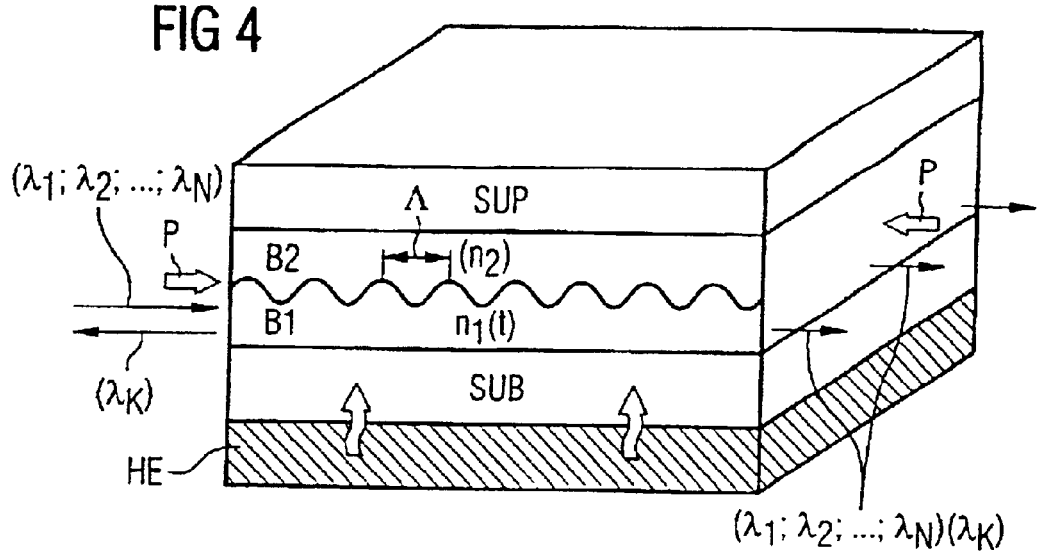
FIG. 4 shows a possible filter construction.

FIG. 4 represents a possible embodiment of the filter in planar technology. The filter consists of an optically conductive material, generally quartz glass, and is essentially formed by a first region B1 having a temperature-dependent refractive index $n_1$ (t), (t—temperature), in which the essential energy component of the light is guided, and a second region B2 having a different temperature-dependent refractive index $n_2$ (t) regions. Only non-essential components of the light are guided in other regions, the substrate SUB and the superstrate SUP. As such, they are only non-essentially involved in the filter action. The interface between the two regions 1 and 2 presents a wave structure of period λ, which has been produced by suitable diffusion or mechanical processing (grating). In the known fashion, this geometrical structure has a wavelength-selective transmission and reflection response, which is represented in FIG. 5.

The resonant wavelength $λ_k$ is essentially determined by the period of the interface. The transmission attenuation is determined essentially by, besides the grating length and the grating amplitude, the difference in refractive index $n_1-n_2$.

Figure 5:
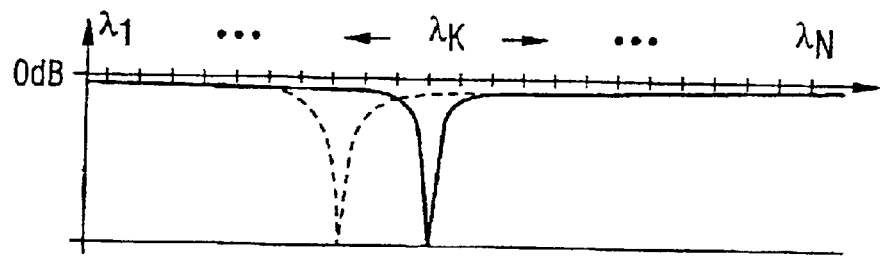
FIG. 5 shows the transmission diagram of the band-stop filter.

The resonant wavelength $λ_K$ can be altered by mechanical pressure P (represented by dashes in FIG. 5). If, for example, a wavelength multiplex signal $λ_1, λ_2 \ldots λ_N$ (the same notation is used here for the optical signals as for the wavelengths) is fed into the filter, then one specific wavelength λ will be reflected whereas all the other wavelengths will be forwarded with very little attenuation.

Figure 6:
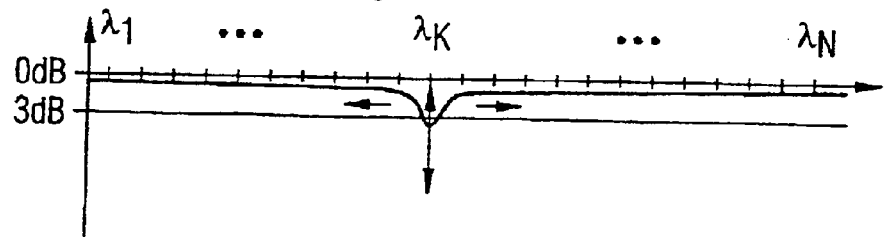
FIG. 6 shows the transmission diagram of the band-stop filter in the case of a drop-and-continue function.

A heating element HE can be used to heat the filter, so that the filter action is reduced and the transmission attenuation is decreased. A drop-and-continue function may be produced by setting an attenuation value of about 3 dB, as can be seen in FIG. 6.

When the system is being reconfigured, the intention is for different optical signals, which have different wavelengths, to be branched off. By using the filter described above, this can be done without interfering with adjacent optical signals (or adjacent multiplex channels). The filter action is firstly removed by heating, so that all signals are forwarded. Tuning to the new wavelength is then carried out by exerting a mechanical pressure corresponding to this wavelength and subsequent cooling in order to restore the filter function, so that a different optical signal is now transmitted. Control circuits (not shown here) can be used to perform very accurate adjustment. Peltier elements may be used as heating and cooling elements.

Owing to their thermo-optical mechanism, these wavelength filters still have relatively high inertia. It is, however, already realistic to expect switchover times of from 10 ms to 500 ms, which is usually acceptable in the case of reconfigurations which are carried out infrequently.

Figure 7:
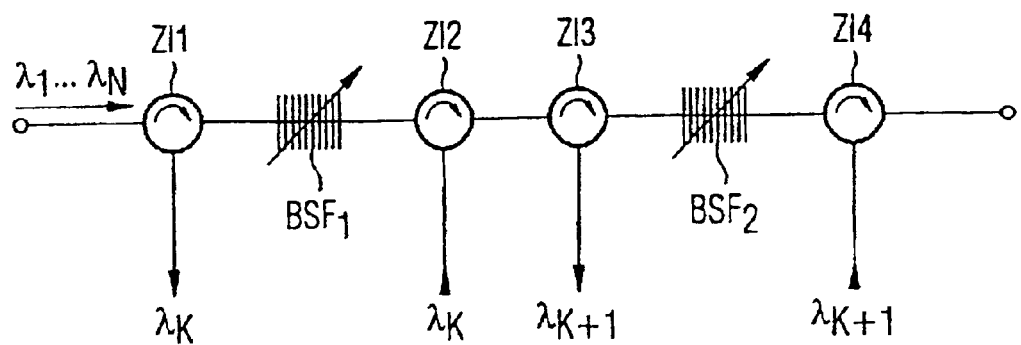
FIG. 7 shows an add-drop-continue device having a series circuit in which a number of add-drop-continue modules are connected together.

In order for a number of optical signals $\lambda_K$, $\lambda_{K+1}$ to be branched off and injected, a number of these modules Z1, BSF1, Z2, Z3, BSF2, Z4 are connected in series according to FIG. 7.

Figure 8:
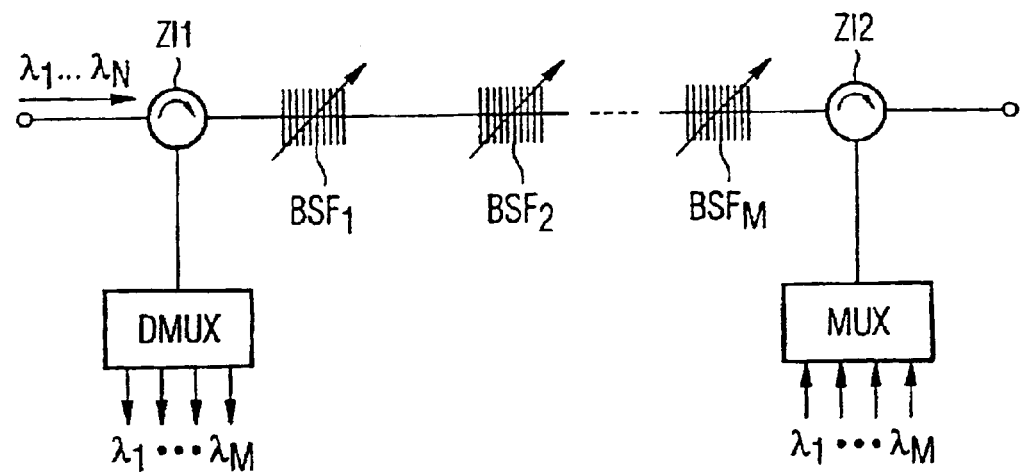
FIG. 8 shows a variant for the simultaneous extraction/injection of a number of WDM channels.

FIG. 8 shows an add-drop-continue module Z1, BSF1, BSF2, BSF3, Zl2, in which a number of band-stop filters BSF1, BSF2, . . . BSFM are interposed between two circulators. According to the number of filters, a number of optical signals $\lambda_1$ to $\lambda_M$ are simultaneously injected or extracted. Individual signals can be branched off or injected by using a demultiplexer DMUX or a multiplexer MUX.

The band-stop filter also may be produced with a larger bandwidth. Instead of individual channels, it is then possible to extract and inject channel groups having adjacent channels.

Figure 9:
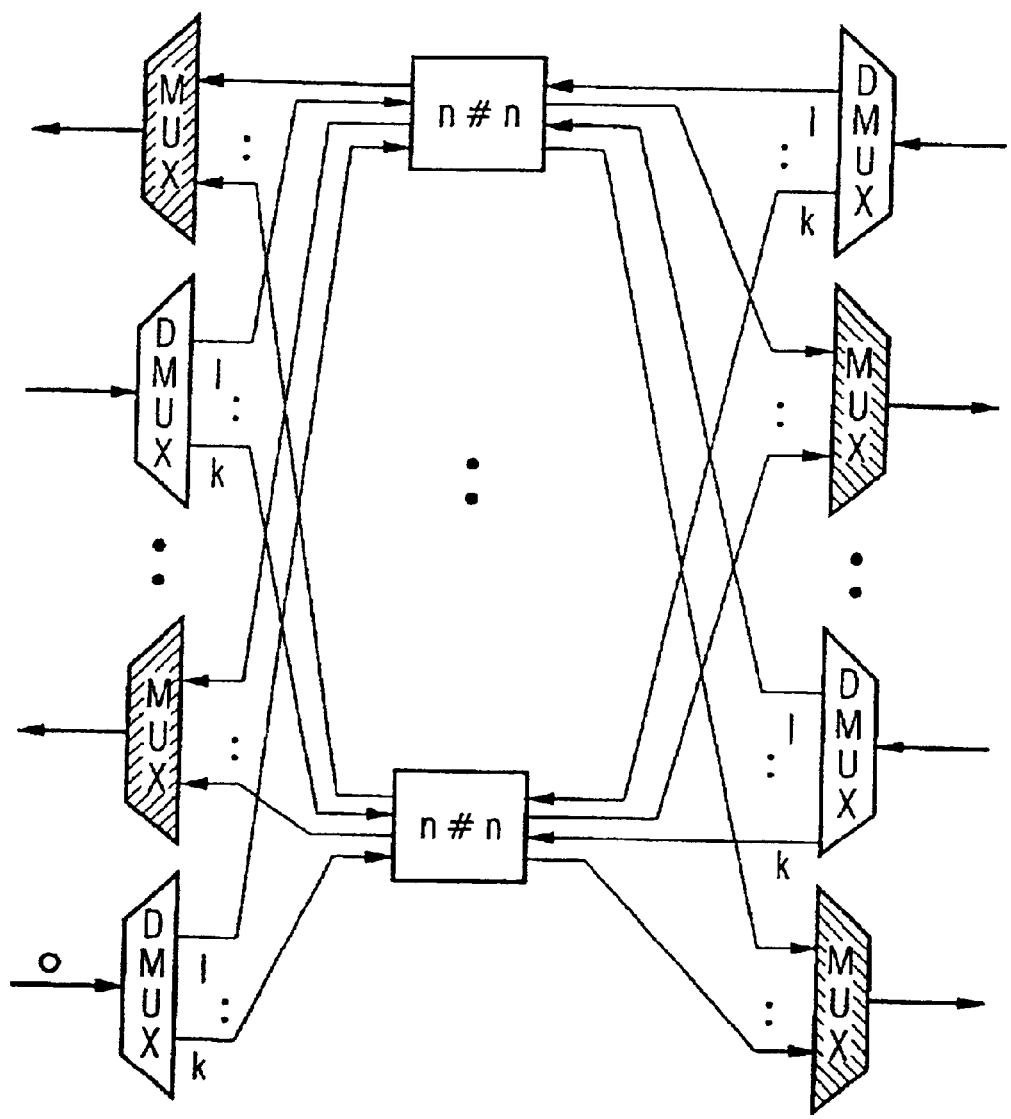
FIG. 9 shows a standard optical cross-connect module (OXC) having optical n×n space-switching subunits.

FIG. 9 shows a solution for a standard optical cross-connect (OXC) having optical n×n space-switching sub-units. In this case, demultiplexers DMUX are connected via optical conductors to a space-switching subunit of dimension n×n, which are, in turn, connected to multiplexers MUX. An incoming optical multi-wavelength signal is decomposed by the demultiplexer DMUX into a single-wavelength signal. These single-wavelength signals are subsequently switched by using optical space-switching sub-units of dimension n×n. The forward-switched single-wavelength signals from the various space-switching subunits then reach the multiplexer MUX, where they are recombined to form an output signal.

In the case of a circuit having, for example, 64 wavelengths per multi-wavelength signal and 4 bidirectional conductors, 64 space-switching subunits of dimension 4×4 are needed.

Through this arrangement, it is possible to switch each single-wavelength signal of an incoming conductor to any desired output conductor.

FIG. 10 gives a schematic representation of a cross-connect module having bundled cross-connect functionality in WDM systems. In this case, wavelengths 1 to n arrive on line 1. The wavelengths 1 to i and 1 to m on lines 1 and 2 are connected together, m describing the maximum number of parallel wavelength signals per fiber in the WDM system and i and 1 being dynamically variable numbers in the range $1 \leq i \leq 1 \leq m$. Similar considerations apply for lines 3 and 4. This connection is indicated by the solid stroke. The dashed lines respectively represent the connection between line 1 and line 3, and between line 2 and line 4, for the wavelengths i to j and k to 1, where i, j, k, 1 are dynamically variable numbers in the range $1 \leq i \leq j \leq k \leq 1 \leq m$.

The dotted lines represent the connections between lines 1 and 4, and between lines 3 and 2, in which the wavelength bundles j to k are switched together, where i, j, k, 1 are dynamically variable numbers in the range $1 \leq i \leq j \leq 1 \leq k \leq 1 \leq m$.

Using this circuit arrangement, it is possible to interconnect wavelength bundles in WDM systems with a cross-connect functionality.

FIG. 11 gives a schematic representation of cascaded cross-connect modules. By connecting circuits of FIG. 10 in succession, it is possible to produce more comprehensive cross-connect functionalities in WDM systems. Two such circuits have been cascaded in FIG. 11, but it is also possible to cascade other circuits and use them in double-star topology, star topology or in meshed networks.

Figure 12:
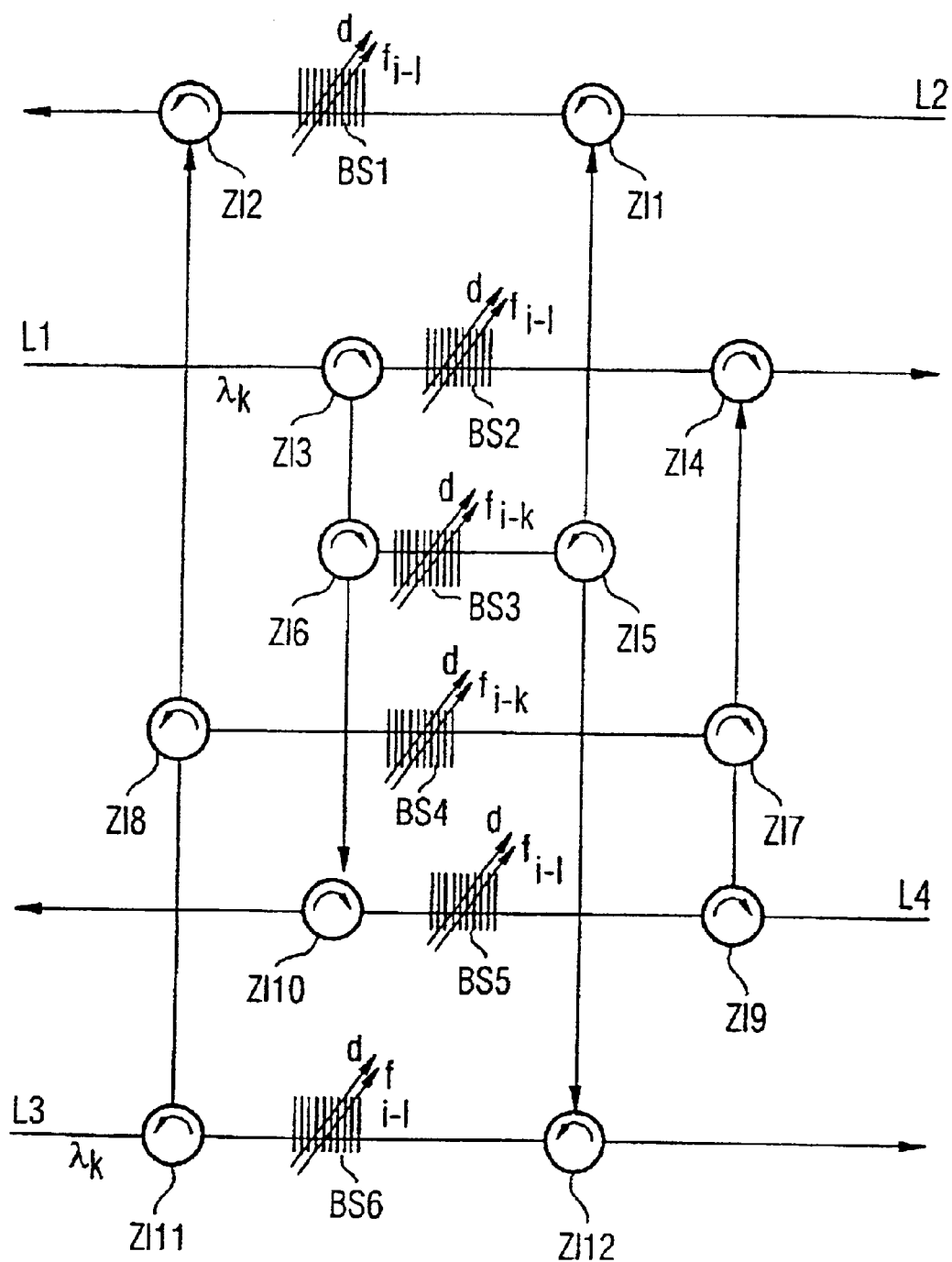
FIG. 12 shows a circuit according to the present invention of a cross-connect module.

FIG. 12 represents a circuit arrangement according to the present invention with bundled cross-connect functionality. Four conductors L1 to L4 are represented, which can be interconnected together. Circulators ZI1 to ZI12 are furthermore provided. These are triple circulators. Optical filters according to the present invention are furthermore provided as band-stop filters BS1 to BS6.

The way in which the circuit operates will be explained with reference to the division of the signals arriving on L2 according to the cross-connect functionality represented in FIG. 10.

The incoming multi-wavelength signal on L2 is completely forwarded via the optical circulator ZI1, in the direction of the arrow, toward the next gate and encounters the optical band-stop filter BS1. This filter reflects the wavelength channels OCH i to 1 that are to be extracted, and the remaining channels are transmitted. In the same way, the wavelength channels i to 1 are extracted from the lines 1, 3 and 4.

The multi-wavelength signal (i to 1) that is extracted on L2 is completely forwarded via the optical circulator ZI5, in the direction of the arrow, toward the next gate and encounters the optical band-stop filter BS3. This filter reflects the wavelength channels OCH j to k, and the remaining channels are transmitted. The multi-wavelength signal that is extracted from line 1 and forwarded to the circulator ZI6 is reflected from the same optical band-stop filter BS3. Conversely, the transmitted wavelength channels OCH i to j and OCH k to 1 are exchanged at the band-stop filter BS3. The same principle is used to process the wavelength bundles extracted from line 3 and line 4.

The multi-wavelength signal coming from the circulator ZI5 is fed via the circulator ZI2 to the line L4. In a similar way, the multi-wavelength signals coming from the circulators ZI6, ZI7, ZI8 are fed to the appropriate line.

The band-stop filters BS1 to BS6 are of broadband design, so that they cover a number of wavelength channels. If one of the filter edges lies outside the wavelength spectrum, then this situation can be used to produce a high-pass or low-pass function. The selection of a wavelength bundle is made possible by the adjustment parameter f at the band-stop filter, which is labeled with the corresponding indices. The "neutralization" of the filter preferably may be performed during reconfigurations by means of the transmission attenuation d.

By using the optical filter according to the present invention in this circuit arrangement, it is possible to extract variable complete wavelength bundles from a multi-wavelength signal.

Figure 13:
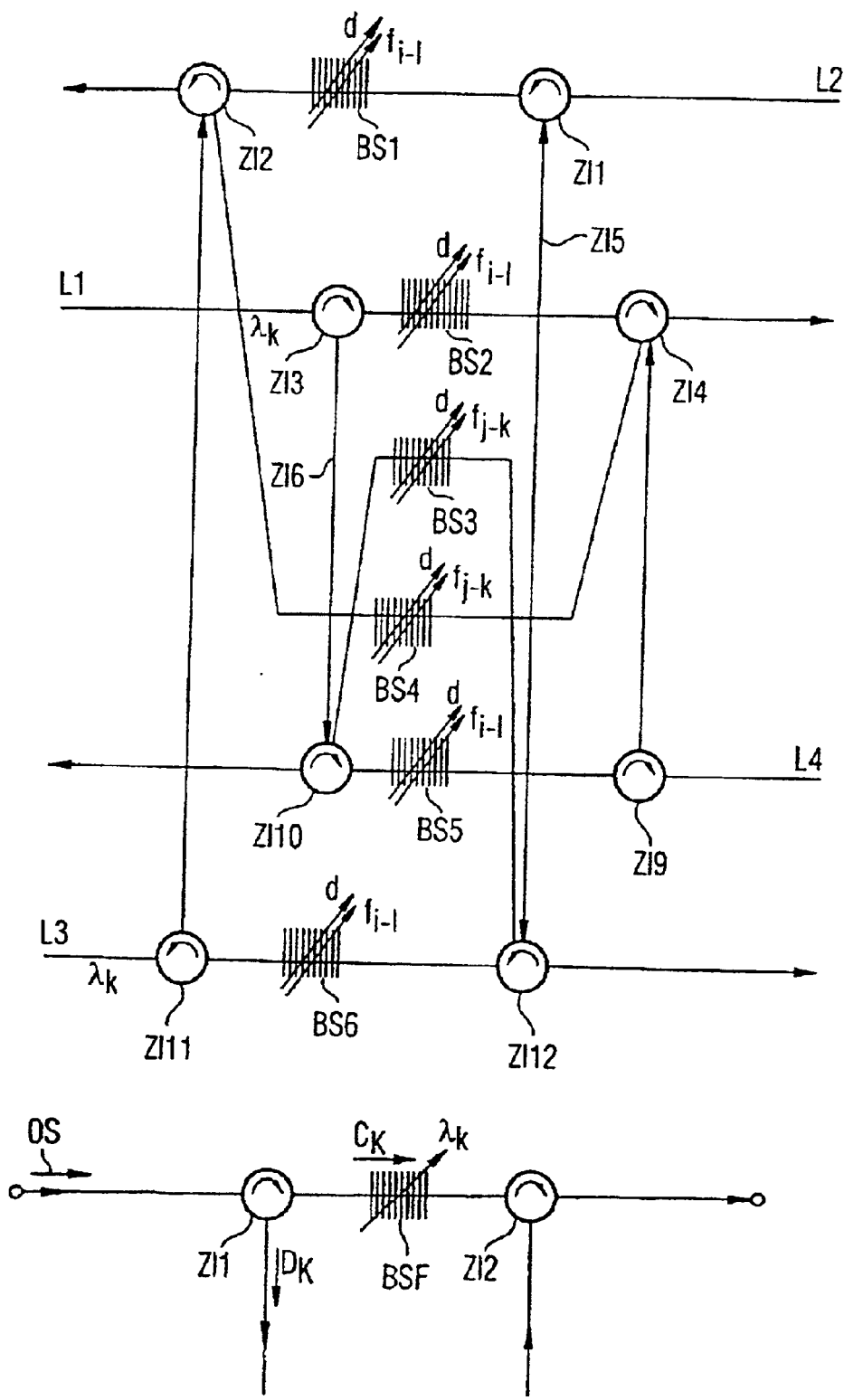
FIG. 13 shows another circuit according to the present invention of a cross-connect module.

FIG. 13 represents a similar circuit arrangement to FIG. 12, but in which the triple circulators have been replaced by quad circulators. As such, it is possible to replace the 12 circulators which were used in the circuit arrangement according to FIG. 12 by 8 quad circulators. The circulators may also may be replaced by Mach-Zehnder structures.

Accordingly, simple allocation of selected multi-wavelength bundles to different multi-wavelength channels is possible. The complexity of the system is reduced, in comparison with cross-connect modules of the prior art according to FIG. 9, to a commensurately greater extent when the number of parallel wavelengths that are to be extracted per conductor is high. In the case of a circuit arrangement having, for example, 64 wavelengths per multi-wavelength signal and 4 bidirectional conductors, the solution variant having space-switching subunits and demultiplexers/multiplexers requires 64 space-switching subunits of dimension 4×4, whereas only 6 band-stop filters need to be used in the circuit arrangements proposed in FIGS. 12 and 13.

Although the present invention has been described with reference to specific embodiments, those of skill in the art will recognize that changes may be made thereto without departing from the spirit and scope of the invention as set forth in the hereafter appended claims.

What is claimed is:

1. An optical filter for producing a drop-and-continue function, comprising:
    a wavelength-selective grating having temperature-dependent reflection and transmission characteristics, wherein a temperature dependent first signal portion of a signal having a particular wavelength is reflected by the grating and a temperature dependent second portion of the signal having a same wavelength as the first portion of the signal is transmitted for effecting a continue function of the optical filter; and
    a device for adjusting a temperature of the grating for selectably determining a single range that is reflected by the grating, the single range defining the first signal portion.

2. An optical filter for producing a drop-and-continue function as claimed in claim 1, wherein filter action of the optical filter is last upon a further temperature change.

3. An optical filter for producing a drop-and-continue function as claimed in claim 1, wherein the grating includes at least two regions in an optically transparent material, each of the at least two regions having respectively different temperature-dependent refractive indices such that a difference between the refractive indices is at least approximately zero at one temperature within a temperature-controllable working range.

4. An optical filter for producing a drop-and-continue function as claimed in claim 3, wherein the filter is designed in planar technology.

5. An optical filter for producing a drop-and-continue function as claimed in claim 1, wherein the filter is designed as a tunable band-stop filter.

6. An optical filter for producing a drop-and-continue function as claimed in claim 5, wherein a bandwidth of the filter is tuned to a bandwidth of a transmission channel.

7. An optical filter for producing a drop-and-continue function as claimed in claim 5, wherein a bandwidth of the filter is tuned to a bandwidth of a plurality of adjacent transmission channels.

8. An optical filter for producing a drop-and-continue function as claimed in claim 5, wherein tuning is carried out by at least one of mechanical pressure, tension and bending.

9. An add-drop-continue module, comprising:
    an insertion device;
    a branching device for optical signals; and
    an optical filter for producing a drop-and-continue function, the optical filter including a wavelength-selective grating having temperature-dependent reflection and transmission characteristics, wherein a temperature dependent first signal portion of a signal having a particular wavelength is reflected by the grating and a temperature dependent second portion of the signal having a same wavelength as the first portion of the signal is transmitted for effecting a continue function of the optical filter, and a device for adjusting a temperature of the grating for selectably determining a single range that is reflected by the grating, the single range defining the first signal portion.

10. An add-drop-continue module as claimed in claim 9, further comprising:
    a plurality of optical filters connected between the branching device and the insertion device.

11. An add-drop-continue module as claimed in claim 9, wherein at least one of the branching device and the insertion device is a circulator.

12. An add-drop-continue device formed of a plurality of add-drop-continue modules connected in series, each of the add-drop-continue modules comprising:
    an insertion device;
    a branching device for optical signals; and
    an optical filter for producing a drop-and-continue function, the optical filter including a wavelength-selective grating having temperature-dependent reflection and transmission characteristics, wherein a temperature dependent first signal portion of a signal having a particular wavelength is reflected by the grating and a temperature dependent second portion of the signal having a same wavelength as the first portion of the signal is transmitted for effecting a continue function of the optical filter, and a device for adjusting a temperature of the grating for selectably determining a single range that is reflected by the grating, the single range defining the first signal portion wherein the optical filter is connected between the branching device and the insertion device.

13. A drop-and-continue module, comprising:
    a branching device for optical signals; and
    a tunable band-stop optical filter for producing a drop-and-continue function, the filter including a wavelength-selective grating having temperature-dependent reflection and transmission characteristics, wherein a temperature dependent first signal portion of a signal having a particular wavelength is reflected by the grating and a temperature dependent second portion of the signal having a same wavelength as the first portion of the signal is transmitted for effecting a continue function of the optical filter, and a device for adjusting a temperature of the grating for selectably determining a single range that is reflected by the grating, the single range defining the first signal portion, wherein the optical filter is connected downstream of the branching device.

14. A cross-connect module, comprising:
    a plurality of inputs;
    a plurality of outputs; and
    at least one optical filter for producing a drop-and-continue function, the filter including a wavelength-selective grating having temperature-dependent reflection and transmission characteristics, wherein a temperature dependent first signal portion of a signal having a particular wavelength is reflected by the grating and a temperature dependent second portion of the signal having a same wavelength as the first portion of the signal is transmitted for effecting a continue function of the optical filter, and a device for adjusting a temperature of the grating for selectably determining a single range that is reflected by the grating, the single range defining the first signal portion.

15. A cross-connect module, comprising:

a plurality of inputs;

a plurality of outputs; and at least one add-drop-continue module having an optical filter connected between a branching device for optical signals and an insertion device, wherein the optical filter produces a drop-and-continue function and includes a wavelength-selective grating having temperature-dependent reflection and transmission characteristics, wherein a temperature dependent first signal portion of a signal having a particular wavelength is reflected by the grating and a temperature dependent second portion of the signal having a same wavelength as the first portion of the signal is transmitted for effecting a continue function of the optical filter, and a device for adjusting a temperature of the grating for selectably determining a single range that is reflected by the grating, the single range defining the first signal portion.

16. A cross-connect module as claimed in claim 14, wherein at least one of the branching device and the insertion device is a quad circulator.

17. A cross-connect device including a plurality of series-connected cross-connect modules, each of the cross-connect modules comprising:

a plurality of inputs;

a plurality of outputs; and at least one optical filter for producing a drop-and-continue function, the filter including a wavelength-selective grating having temperature-dependent reflection and transmission characteristics, wherein a temperature dependent first signal portion of a signal having a particular wavelength is reflected by the grating and a temperature dependent second portion of the signal having a same wavelength as the first portion of the signal is transmitted for effecting a continue function of the optical filter, and a device for adjusting a temperature of the grating for selectably determining a single range that is reflected by the grating, the single range defining the first signal portion.

18. A method for tuning an optical filter, wherein the optical filter produces a drop-and-continue function, without interfering with transmitted signals, the method comprising the steps of:

providing the optical filter with a wavelength-selective grating having temperature-dependent reflection and transmission characteristics, wherein a temperature dependent first signal portion of a signal having a particular wavelength is reflected by the grating and a temperature dependent second portion of the signal having a wavelength which is the same as the wavelength of the first portion of the signal is transmitted to effect a continue function of the optical filter;

providing the optical filter with a device for adjusting a temperature of the grating for selectively determining a single range that is reflected by the grating, the single range defining the first signal portion;

adjusting the optical filter such that, as a result of a first temperature change, the optical filter loses its filter characteristic;

tuning the optical filter to a predetermined new wavelength; and subsequently adjusting the optical filter, as a result of a further temperature change, such that the optical filter regains its filter characteristic at a newly adjusted wavelength.

19. A method of using an optical filter to assist in the production of a circuit having at least one of add-and-drop functionality, drop-and-continue functionality, multicast functionality, dual-homing functionality and cross-connect functionality, the method comprising the steps of:

providing an optical filter for producing a drop-and-continue function;

providing a wavelength-selective grating within the optical filter having temperature-dependent reflection and transmission characteristics, wherein a temperature dependent first signal portion of a signal having a particular wavelength is reflected by the grating and a temperature dependent second portion of the signal having a same wavelength as the first portion of the signal is transmitted to effect a continue function of the optical filter; and providing a device in the optical filter for adjusting a temperature of the grating, for selectably determining a single range that is reflected by the grating, the single range defining the first signal portion.

* * * * *